3,195,670
TORSION BAR VEHICLE SUSPENSION
Michael R. D. Dunn, Coventry, England, assignor to Ford Motor Company, Dearborn, Mich., a corporation of Delaware
Filed Oct. 7, 1963, Ser. No. 314,100
2 Claims. (Cl. 180—73)

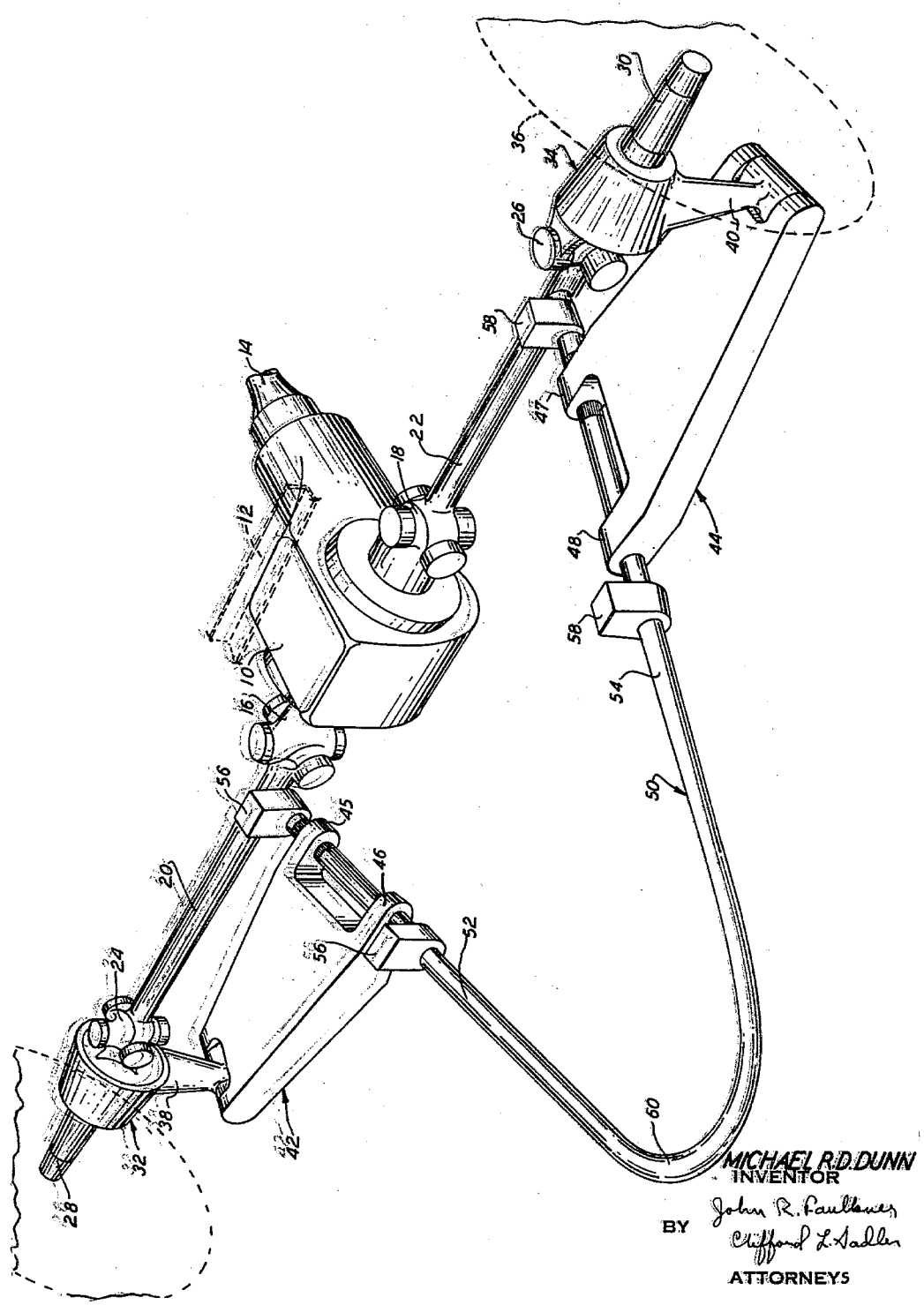

The present invention relates to motor vehicle suspension systems. More particularly, this invention concerns vehicle suspensions of the torsion bar type.

The present invention has particular application to independent suspension systems. In accordance with the presently preferred embodiment, laterally extending suspension arms are used to connect left and right vehicle wheel assemblies with the vehicle chassis. A U-shaped torsion bar is interposed between the ends of the suspension arms where they are connected with the vehicle chassis. The U-shaped torsion bar is not otherwise supported.

Torsion bars have been used before to interconnect laterally spaced wheel support arms. In those structures the bars are provided to increase the spring rate during roll and are referred to as anti-sway or anti-roll stabilizer bars. Due to the unique geometry of the present invention, the interconnecting U-shaped torsion bar provides pro-roll rather than anti-roll characteristics. Pro-roll is desirable in certain independent suspensions.

The several advantages of the present invention will be more fully understood upon consideration of the following detailed description and the accompanying drawing which discloses a perspective view of the presently preferred embodiment.

The drawing shows a conventional differential gear unit 10 mounted upon a portion of the vehicle chassis 12. The differential 10 receives power from a vehicle engine and drive-line (not shown) through its input shaft 14. Left and right output members of the differential 10 are connected by universal joints 16 and 18 to the left and right half-shafts 20 and 22. The output ends of the half-shafts 20, 22 are similarly connected by outer universal joints 24, 26 to stub or driving shafts 28 and 30. The two driving shafts 28, 30 are journaled in bearing housing 32 and 34 and are drivingly connected to road wheels 36.

The bearing housings 32, 34 have portions 38 and 40 that extend downwardly therefrom. These lower extremities 38, 40 of the housings 32, 34 are pivotally connected to the outer ends of left and right lower suspension arms 42 and 44. The inner ends of the lower arms 42, 44 are bifurcated and have inwardly projecting parts 45, 46 and 47, 48. The front ones 45 and 47 of the projecting parts are internally splined and the rear ones 46 and 48 are bushed to receive a shaft.

A U-shaped torsion bar 50 is provided having left and right branches or legs 52 and 54 that extend through the bushed rear projecting parts 46 and 48 of the suspension arms 42, 44 and into splined engagement with the front projecting parts 45, 47. The ends of the legs 52, 54 extend beyond the splined parts 45, 47. Bearing supports 56 and 58 are connected to the vehicle chassis and provide pivotal support for the torsion bar legs 52 and 54. One set of the bearing supports 56, 58 rotatably carry the forward extending end of the torsion bar legs 52, 54. The rear set of supports 56, 58 engage the legs 52, 54 just rearwardly of the rear projecting parts 46, 48 of the suspension arms. The torsion bar 50 is not connected to the vehicle chassis other than its pivotal support at the bearings 56, 58.

The suspension unit of the drawing is readily attached to a vehicle by securing the differential 10 and the bearing brackets or supports 56, 58 to chassis frame members. The half-shafts 20, 22 and the inner and outer universal joints 16, 18 and 24, 26 are of finite length so that these elements constitute the upper control arm of the suspension system. They combine to support and position the wheels 36 that are secured to the stub shafts 28, 30.

With a vehicle suspension of the type disclosed in the drawing, when one wheel, such as the right wheel 36, moves upwardly the right leg 54 of the bar 50 is twisted. At the base or major bend 60 of the U-shaped bar 50, the torsional stress decreases and the base is bent upwardly. In the left-hand leg 52, there exists an upward bending stress and only a small amount of torsional stress.

It is noted in this embodiment of the invention, that the torsion bar 50 not only provides the spring means of the suspension system, but that the bar legs 52 and 54 constitute the pivot shaft for the suspension arms 42, 44. In other words, the pivot axes for the suspension arms 42, 44 coincide with the axes of the legs 52, 54 of bar 50. In a general sense, the legs 52, 54 are parallel to the longitudinal axis of the vehicle in order to accomodate jounce and rebound movement of the wheels 36 and the associated suspension. In actuality, the legs 52, 54 are set at a slight angle so as to provide understeer toe-in on jounce.

If the bearing supports 56, 58 for the left and right arms 42, 44 are widely spaced, the loading on the bearings is reduced under single wheel jounce condition. The distance separating the bearing brackets or supports 56, 58 is, however, limited by the fact that the lower arms 42, 44 should be longer than the upper arms (inner U-joints 16, 18, half-shafts 20, 22, outer U-joints 24, 26 and stub shafts 28, 30) in order to obtain the desired camber change in roll. The choice of the ratio between the length of the lower arms 42, 44 and the distance separating the bearing supports 56, 58 is, therefore, a compromise.

The foregoing description constitutes the presently preferred embodiment of this invention. Other arrangements may occur to those skilled in the art that will come within the scope and spirit of the following claims.

I claim:

1. A vehicle suspension system having a chassis and a differential gear unit secured to said chassis, left and right shaft assemblies, said shaft assemblies each comprising an inner universal joint connected to the power output of said differential gear unit, a shaft connected to said inner universal joint at its inner end, an outer universal joint connected to the outer end of said shaft, a stub shaft connected to said outer universal joint, said stub shaft being connected to a road wheel, said shaft assemblies each being of a fixed length and constructed to position said wheels laterally of said differential gear unit, a pair of left bearing supports and a pair of right bearing supports secured to said chassis, a U-shaft torsion bar having a first leg journalled in said left bearing supports and a second leg journalled in said right bearing supports, left and right laterally extending suspension arms, said suspension arms each having spaced apart mounting portions at their inner ends, one of said mounting portions being secured to said torsion bar and the other of said mounting portions being rotatably connected to said torsion bar, means rotatably supporting said stub shafts and having a depending portion, hinge means connecting the outer ends of said suspension arms with said depending portion.

2. A vehicle suspension system having a chassis and a differential gear unit secured to said chassis, left and right shaft assemblies, said shaft assemblies each comprising an inner universal joint connected to the power output of said differential gear unit, a shaft connected to said inner universal joint at one of its inner ends, an outer universal joint connected to the outer end of said shaft, a stub shaft connected to said outer universal joint, said stub shaft being connected to a road wheel, said shaft assemblies each being of a fixed length and constructed to position said wheels laterally of said differential gear unit, left bearing supports and right bearing supports secured to said chassis, a U-shaft torsion bar having a first leg journalled in said left bearing supports and a second leg journalled in said right bearing supports, left and right laterally extending suspension arms, said suspension arms each having spaced apart mounting portions at their inner ends, one of said mounting portions being secured to said torsion bar and the other of said mounting portions being rotatably connected to said torsion bar, means rotatably supporting said stub shafts, hinge means connecting the outer ends of said suspension arms with said first mentioned means.

References Cited by the Examiner
UNITED STATES PATENTS

| | | | |
|---|---|---|---|
| 2,079,671 | 5/37 | Zubaty | 180—73 |
| 2,191,211 | 2/40 | Krotz. | |
| 2,233,293 | 2/41 | Matthews | 180—73 |
| 2,741,493 | 4/56 | Matthias | 280—124 |
| 2,915,321 | 12/59 | Wilfert | 280—124 |

A. HARRY LEVY, *Primary Examiner.*